United States Patent
Krause

(10) Patent No.: US 12,209,356 B2
(45) Date of Patent: Jan. 28, 2025

(54) WETOUT BOX APPARATUS

(71) Applicant: Advanced Architectural Products, LLC, Allegan, MI (US)

(72) Inventor: G. Matt Krause, Allegan, MI (US)

(*) Notice: Subject to any disclaimer, the term of this patent is extended or adjusted under 35 U.S.C. 154(b) by 107 days.

(21) Appl. No.: 17/576,825

(22) Filed: Jan. 14, 2022

(65) Prior Publication Data
US 2022/0243388 A1 Aug. 4, 2022

Related U.S. Application Data

(60) Provisional application No. 63/137,624, filed on Jan. 14, 2021.

(51) Int. Cl.
| | | |
|---|---|---|
| D06M 10/10 | (2006.01) |
| B05C 1/08 | (2006.01) |
| B05C 3/132 | (2006.01) |
| B05C 3/152 | (2006.01) |
| D06M 23/00 | (2006.01) |

(52) U.S. Cl.
CPC ............ *D06M 10/10* (2013.01); *B05C 1/086* (2013.01); *B05C 1/0865* (2013.01); *B05C 3/132* (2013.01); *B05C 3/152* (2013.01); *D06M 23/00* (2013.01)

(58) Field of Classification Search
USPC ................................. 118/410, 420, 428, 429
See application file for complete search history.

(56) References Cited

U.S. PATENT DOCUMENTS

| | | | | |
|---|---|---|---|---|
| 4,056,954 A | * | 11/1977 | Meier-Windhorst | .... D06B 3/20 68/205 R |
| 5,063,143 A | * | 11/1991 | Hirose | ................ G03C 7/3003 430/419 |
| 6,346,153 B1 | * | 2/2002 | Lake | ...................... A47K 10/32 118/423 |
| 7,001,465 B1 | * | 2/2006 | Thomas | ................ B05C 3/132 118/423 |

* cited by examiner

*Primary Examiner* — Yewebdar T Tadesse
(74) *Attorney, Agent, or Firm* — The Watson IP Group, PLC; Jovan N. Jovanovic

(57) ABSTRACT

A wetout box apparatus is comprised of a breaker container, a first insert member, a second insert member, and a plurality of breaker bars. The breaker container is to store a volume of resin therein, the breaker container including a first slot and a second slot that allow a mat to enter and exit the breaker container, respectively. The first insert member is to be disposed within the breaker container on a first side of the breaker container. The second insert member is to be disposed within the breaker container on a second side of the breaker container. The plurality of breaker bars are coupled to the first and second insert members, the plurality of breaker bars forming a snaking path for the mat between the first slot and the second slot.

14 Claims, 6 Drawing Sheets

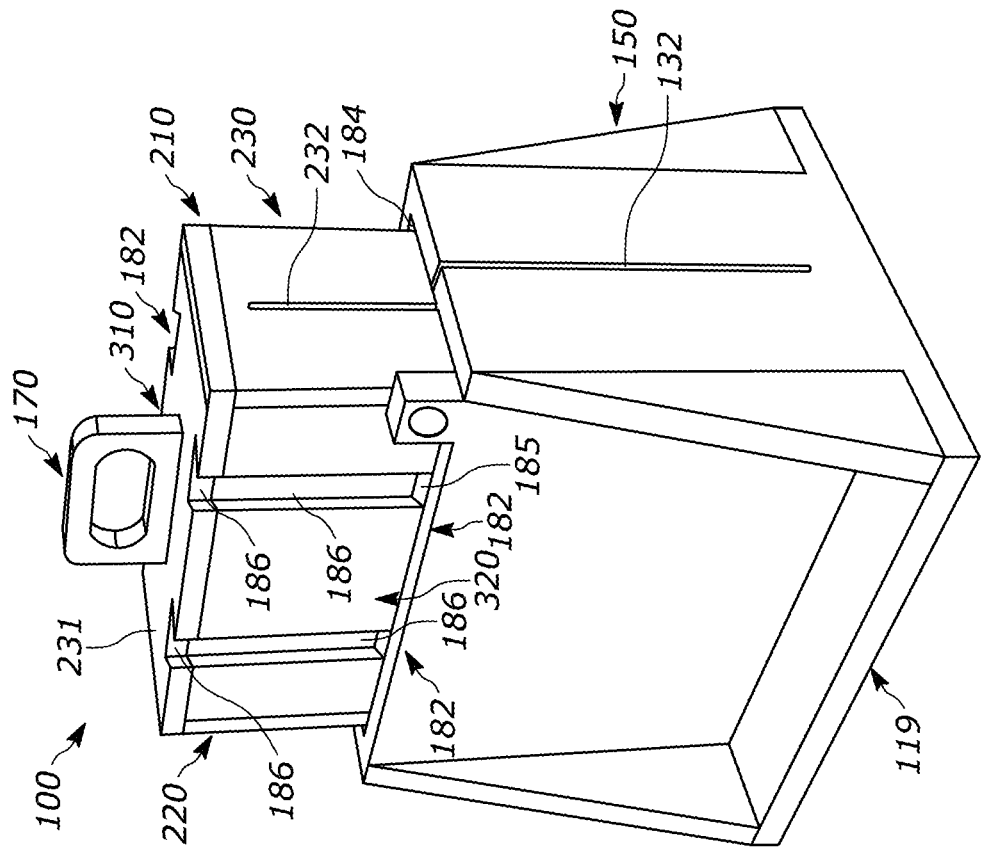
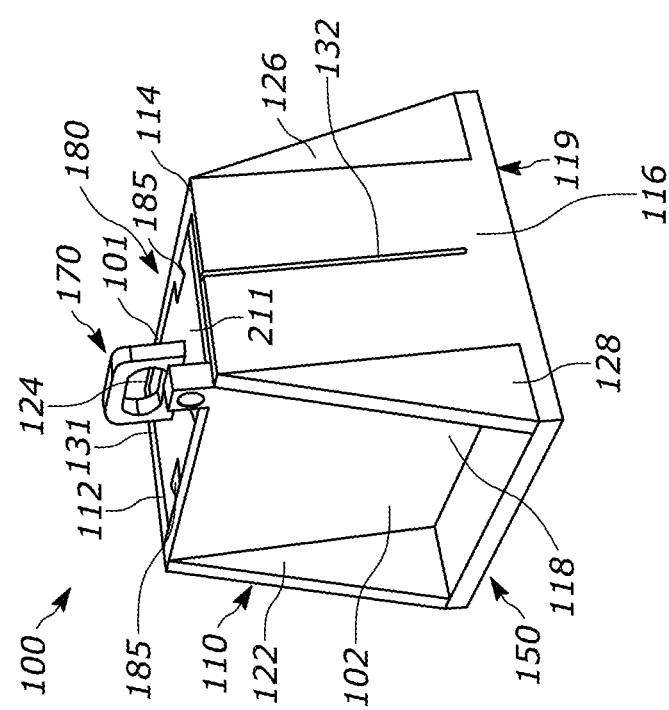
FIGURE 2
FIGURE 1

WETOUT BOX APPARATUS

CROSS-REFERENCE TO RELATED APPLICATION

This application claims priority from U.S. Provisional Patent Application Ser. No. 63/137,624 filed on Jan. 14, 2021, entitled "WETOUT BOX APPARATUS", the entire disclosure of which is hereby incorporated by reference in its entirety.

BACKGROUND OF THE DISCLOSURE

1. Field of the Disclosure

The disclosure relates in general to fiber composite constructions, and more particularly, to a wetout system for the application of resin to fibers.

2. Background Art

In pultrusion, a pultruded profile typically includes rovings and/or stitched/woven mats and/or a surface veil. This material is typically combined with a resin matrix and pulled through a heated die that cures the composite materials into the desired profile. Typically, the resin is combined with fibers in a resin bath. It is desirable to have the proper application of resin onto the fibers to complete the wetout process.

In many instances, woven or stitched fiberglass materials (or other fibrous materials) come sewn together and getting a good wetout (resin saturation between the individual material fibers) can be difficult. And, the use of breaker bars is necessary. Breaker bars, bend at the fiber bundles, creating openings and gaps between the individual fibers allowing the resin to better encapsulate the material.

Typically, the process is achieved by experimentally putting a design in a production resin bath, running a sample material and testing the configuration. Because it is done with a pultruder, a great amount of time is lost, in set up and starting and stopping the machine, allowing for proper heating (exothermic and endothermic balancing of the profile temps.)—i.e., each iteration of a test can take as much as 3-6 hours each.

SUMMARY OF THE DISCLOSURE

The disclosure is directed to a wetout box apparatus comprising a breaker container, a first insert member, a second insert member, and a plurality of breaker bars. The breaker container is to store a volume of resin therein, the breaker container including a first slot and a second slot that allow a mat to enter and exit the breaker container, respectively. The first insert member is to be disposed within the breaker container on a first side of the breaker container. The second insert member is to be disposed within the breaker container on a second side of the breaker container. The plurality of breaker bars are coupled to the first and second insert members, the plurality of breaker bars forming a snaking path for the mat between the first slot and the second slot.

In at least one configuration of the wetout box apparatus, the plurality of breaker bars each include an arm that is perpendicularly coupled to first sides of the first and second insert members, respectively.

In at least one configuration of the wetout box apparatus, the arm is substantially a same height as the first and second insert members.

In at least one configuration of the wetout box apparatus, pairs of the arm are disposed proximate to each other to route the mat parallel with respect to the arm.

In at least one configuration of the wetout box apparatus, the plurality of breaker bars each further include a rod coupled to an opposite end of the arm from an end of the arm that is coupled to the first sides of the first and second insert members, respectively.

In at least one configuration of the wetout box apparatus, the rod is substantially a same height as the plurality of breaker bars.

In at least one configuration of the wetout box apparatus, the breaker container includes a first side wall, a second side wall, a third side wall, a fourth side wall, and a base member, the first, second, third, fourth side walls and the base member coupled to store the volume of the resin.

In at least one configuration of the wetout box apparatus, the wetout box apparatus further includes first, second, third, and fourth reinforcement members disposed at corners of the breaker container, the first, second, third, and fourth reinforcement members each coupled to the base member, the first and second reinforcement members being coupled to the first side wall, and the third and fourth reinforcement members being coupled to the third side wall.

In at least one configuration of the wetout box apparatus, the wetout box apparatus further comprises a lid member coupled to first ends of the first and second insert members.

In at least one configuration of the wetout box apparatus, the wetout box apparatus further comprises a handle coupled to a first side of the lid member.

In at least one configuration of the wetout box apparatus, the wetout box apparatus further comprises a first end member coupled to first ends of the first and second insert members, respectively, and a second end member coupled to second ends of the first and second insert members, respectively, the first end member including a third slot and the second end member including a fourth slot that allow the mat to enter and exit the breaker container, respectively.

In at least one configuration of the wetout box apparatus, the wetout box apparatus further comprises a coupling mechanism to couple the first and second insert members to the breaker container.

In at least one configuration of the wetout box apparatus, the coupling mechanism includes a plurality of dovetail joints disposed along an inside perimeter of the breaker container.

In at least one configuration of the wetout box apparatus, the breaker container includes a base member, the plurality of breaker bars disposed perpendicular with respect to the base member.

In at least one configuration of the wetout box apparatus, the breaker container includes a base member, the plurality of breaker bars disposed at an acute angle with respect to the base member.

In at least one configuration of the wetout box apparatus, the breaker container is rectangular.

The disclosure is directed to a method comprising disposing a mat between a plurality of breaker bars; disposing first and second insert members inside of a breaker container; disposed the mat within first and second slots of the breaker container; pulling the mat through the breaker container; and applying resin to the mat. A wetout box comprises the breaker container to store a volume of resin therein, the breaker container including a first slot and a second slot that allow the mat to enter and exit the breaker container, respectively; the first insert member to be disposed within the breaker container on a first side of the breaker container; the second insert member to be disposed within the breaker container on a second side of the breaker container; and the plurality of breaker bars are coupled to the first and second insert members, the plurality of breaker bars forming a snaking path for the mat between the first slot and the second slot.

In at least one configuration of the method, the breaker container includes a base member, the plurality of breaker bars disposed perpendicular with respect to the base member.

In at least one configuration of the method, the breaker container includes a base member, the plurality of breaker bars disposed at an acute angle with respect to the base member.

In at least one configuration of the method, the plurality of breaker bars each include an arm that is perpendicularly coupled to first sides of the first and second insert members, respectively.

In at least one configuration of the method, pairs of the arm are disposed proximate to each other to route the mat parallel with respect to the arm.

BRIEF DESCRIPTION OF THE DRAWINGS

The disclosure will now be described with reference to the drawings wherein:

FIG. 1 illustrates an isometric view of an assembled configuration of an example wetout box disclosed herein;

FIG. 2 illustrates the wetout box shown in FIG. 1 with exemplary insert members partially inserted into an exemplary breaker container disclosed herein;

DETAILED DESCRIPTION OF THE DISCLOSURE

Figure 3A:
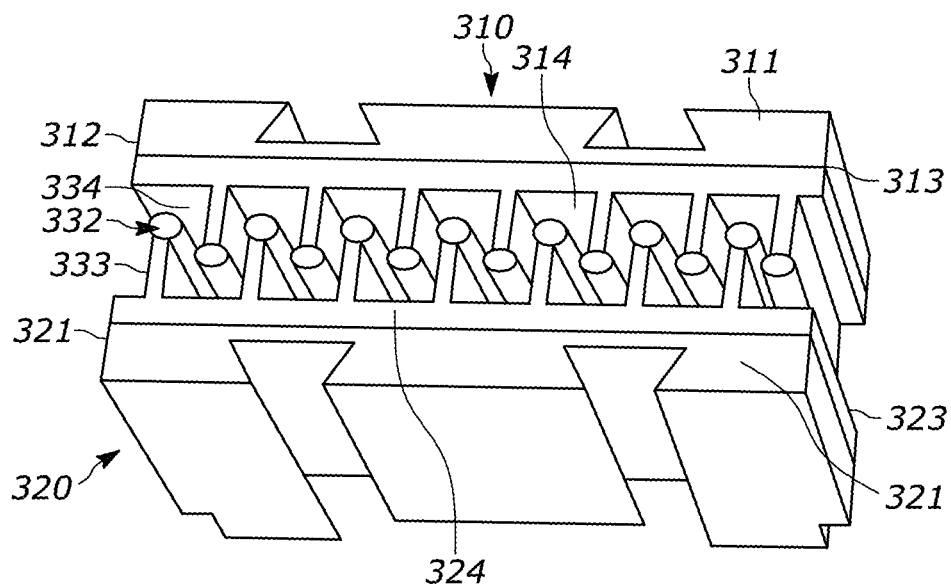
FIGS. 3A and 3B illustrate two different configurations of exemplary plurality of breaker bars disclosed herein.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIGS. 1-6, an apparatus is disclosed, such as a wetout box apparatus 100. The wetout box apparatus 100 includes a breaker container 150, a first insert member 310, a second insert member 320, and a plurality of breaker bars 332. The breaker container 150 is a container that is used to store a volume of a resin matrix, resin 510 therein. The breaker container 150 also allows a mat 710 (FIG. 7), rovings and/or stitched/woven mats and/or a surface veil, to enter and exits the breaker container 150. As such, the breaker container 150 including a first slot 131 and a second slot 132 on an opposite side of the breaker container 150 than the first slot 131. The first slot 131 allows the mat 710 to enter the breaker container 150 and the second slot 132 allows the mat 710 to exit the breaker container 150. In at least one configuration, the base member 119 is approximately 11.496 inches in length on sides of the base member 119 that correspond to the first and second slots 131, 132, although other lengths are possible.

Although the breaker container 150 can be configured in various ways, in the exemplary configuration shown the breaker container 150 includes a first side wall 112, a second side wall 114, a third side wall 116, a fourth side wall 118, and a base member 119. The first, second, third, fourth side walls 112, 114, 116, 118 and the base member 119 are coupled to allow the breaker container 150 store the volume of the resin 510. Although the first, second, third, fourth side walls 112, 114, 116, 118 and the base member 119 can form various shapes, in the exemplary configuration shown the first, second, third, fourth side walls 112, 114, 116, 118 and the base member 119 form a rectangle. Thus, the breaker container 150 is rectangular, although other shapes are possible. For example, the first, second, third, fourth side walls 112, 114, 116, 118 and the base member 119 can be integrated, bonded, welded, and any other method of coupling that allows the breaker container 150 store the volume of the resin 510.

In at least one configuration, the wetout box apparatus 100 according can further include first, second, third, and fourth reinforcement members 122, 124, 126, 128 disposed at corners of the breaker container 150. The first, second, third, and fourth reinforcement members 122, 124, 126, 128 are each coupled to the base member 119. The first and second reinforcement members 122, 124 are coupled to the first side wall 112, and the third and fourth reinforcement members 126, 128 are coupled to the third side wall 116. In at least one configuration, the first, second, third, and fourth reinforcement members 122, 124, 126, 128 are 2.5 inches in width at their widest point, where they are coupled to the base member 119, although other widths are possible. In at least one configuration, the first, second, third, fourth side walls 112, 114, 116, 118 are 9.250 inches in height, although other heights are possible.

The wetout box apparatus 100 further includes a first insert member 310 to be disposed within the breaker container 150 on a first side 101 of the breaker container 150, and a second insert member 320 to be disposed within the breaker container 150 on a second side 102 of the breaker container 150. The plurality of breaker bars 332 are coupled to the first and second insert members 310. The plurality of breaker bars 332 form a snaking path for the mat 710 between the first slot 131 and the second slot 132.

Figure 7:
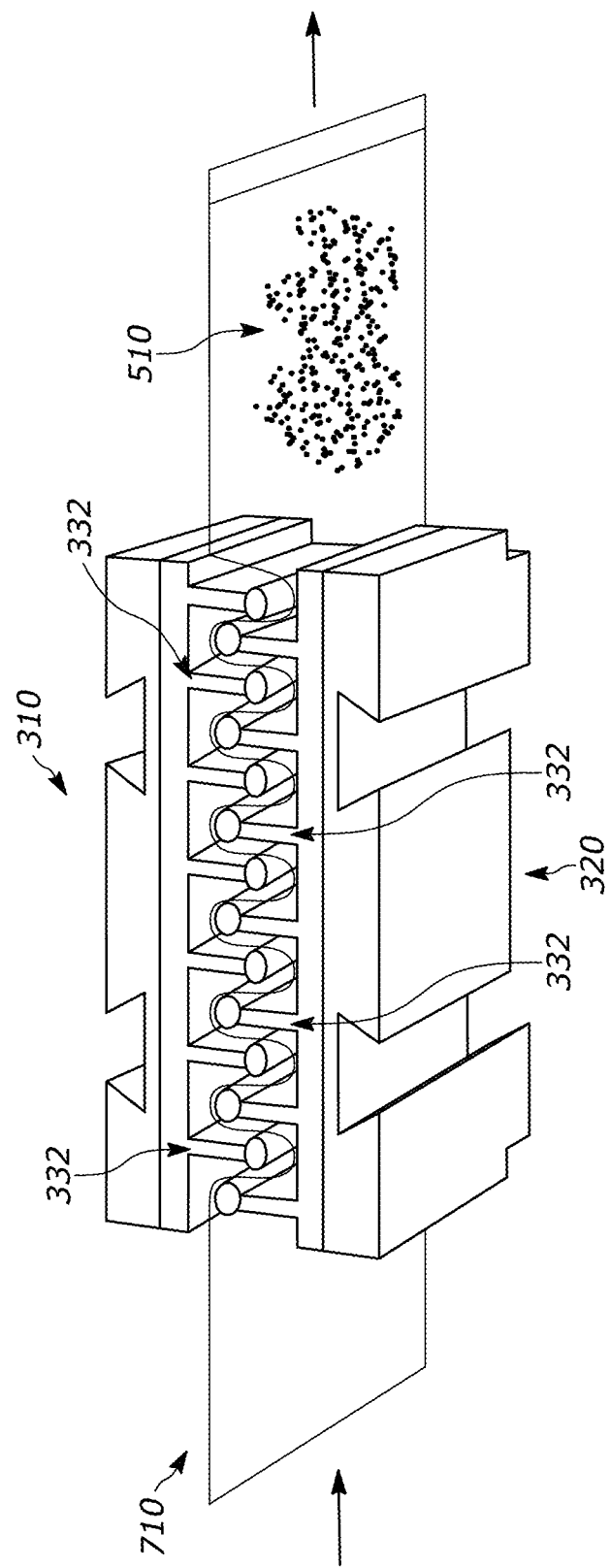
FIG. 7 illustrates the insert members shown in FIGS. 3A and 4B with a mat snaking between the plurality of breaker bars thereof.

Although the breaker bars 332 can be configured in various ways, in at least one configuration shown, the plurality of breaker bars 332 each include an arm 333 that is perpendicularly coupled to first sides 314, 324 of the first and second insert members 310, 320, respectively. The arm 333 extends away from the first and second insert members 310, 320, into a cavity between the first and second insert members 310, 320. In at least one configuration, the arm 333 is substantially a same height as the first and second insert members 310, although other heights are possible. For example, the arm 333 can be configured a same height as the mat 710. In at least one configuration, pairs of the arm 333 are disposed proximate to each other to route the mat 710 parallel with respect to the arm 333, as shown in FIG. 7. To increase a surface area onto which the mat 710 contacts, in at least one configuration the plurality of breaker bars 332 each further include a rod 334 coupled to an opposite end of the arm 333 from an end of the arm 333 that is coupled to the first sides 314, 324 of the first and second insert members 310, 320, respectively. As shown, the rod 334 is approximately twice a width as the arm 333, although other widths are possible. The rod 334 can be substantially a same height as the plurality of breaker bars 332, although other heights are possible. For example, the rod 334 can be configured a same height as the mat 710.

Figure 3B:
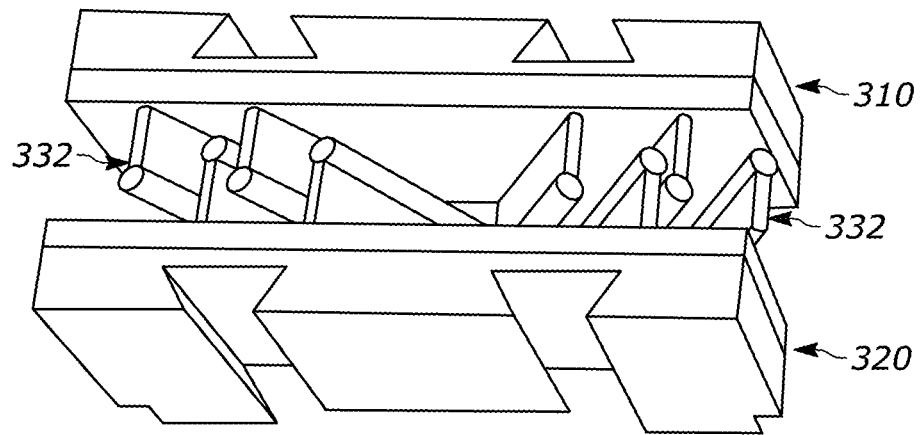
Figure 4A:
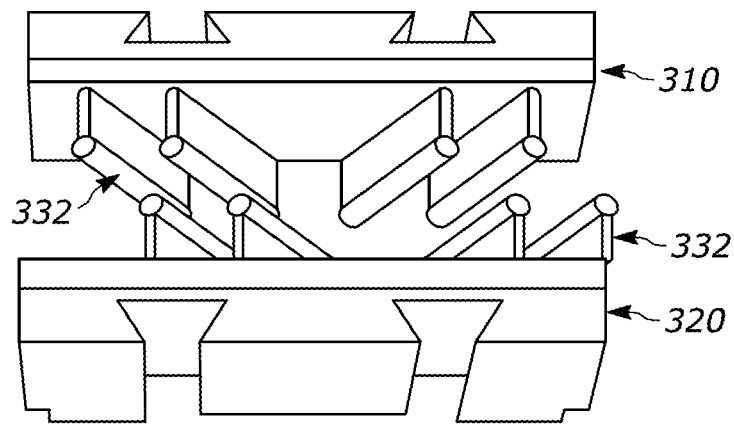
FIG. 4A illustrates another isometric view of the plurality of breaker bars shown in FIG. 3B.
Figure 4B:
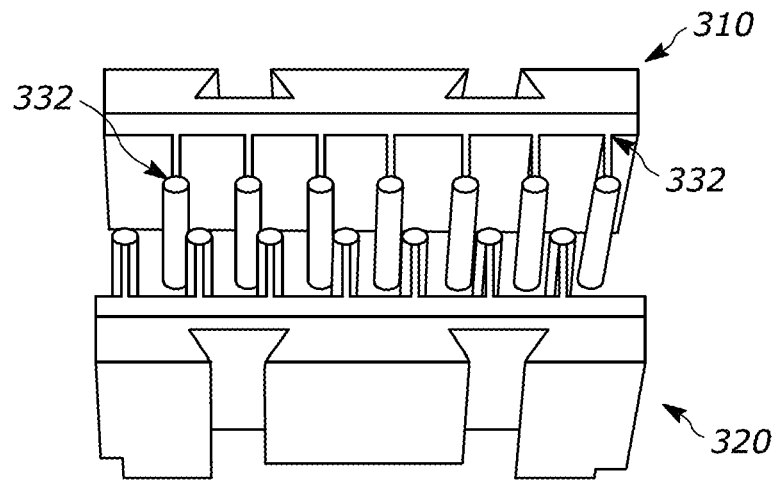
FIG. 4B illustrates another isometric view of the plurality of breaker bars shown in FIG. 3A.
Figure 4C:
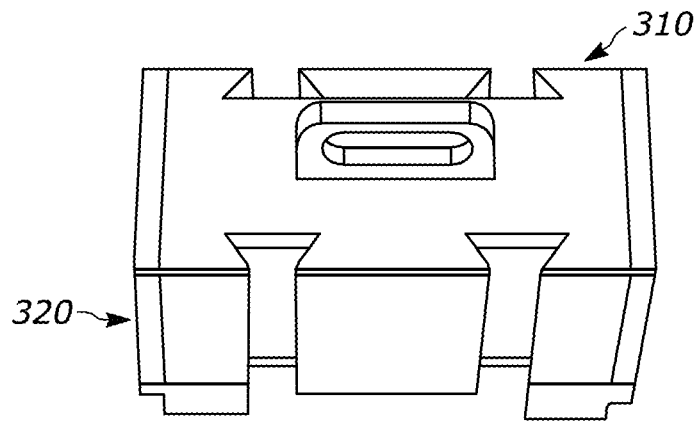
FIG. 4C illustrates another isometric view of the insert members shown in FIGS. 2-4B.
Figure 5:
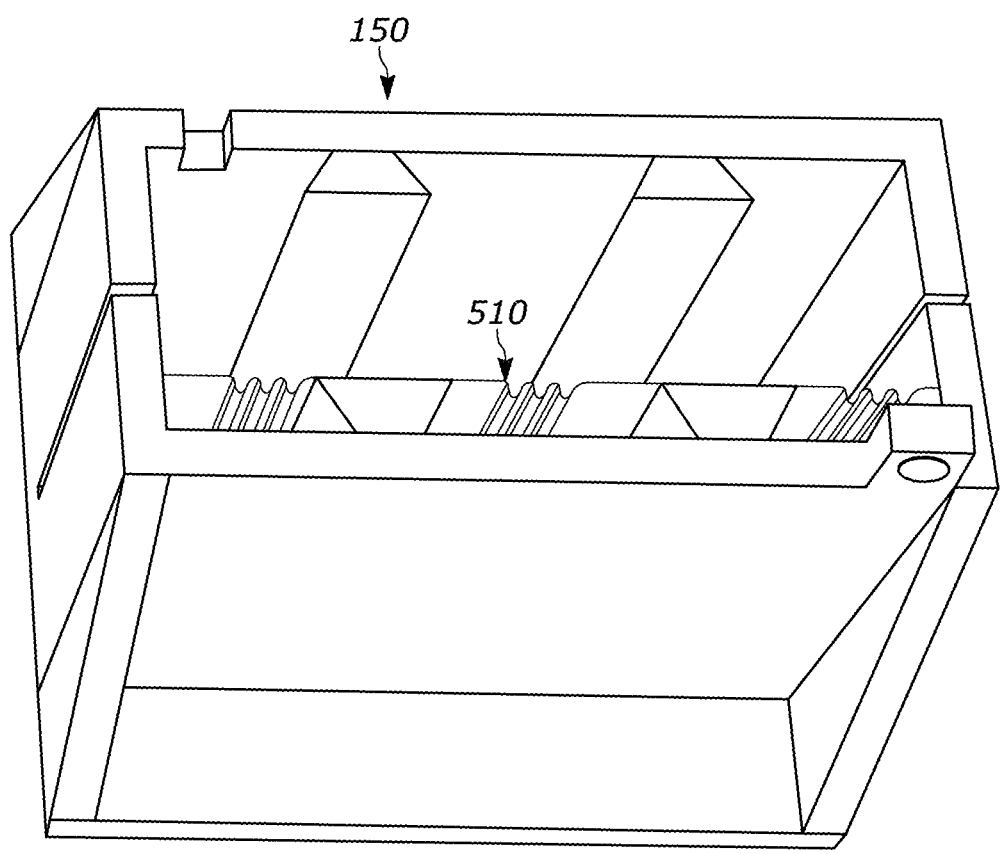
FIG. 5 illustrates another isometric view of the breaker container shown in FIGS. 1 and 2.
Figure 6:
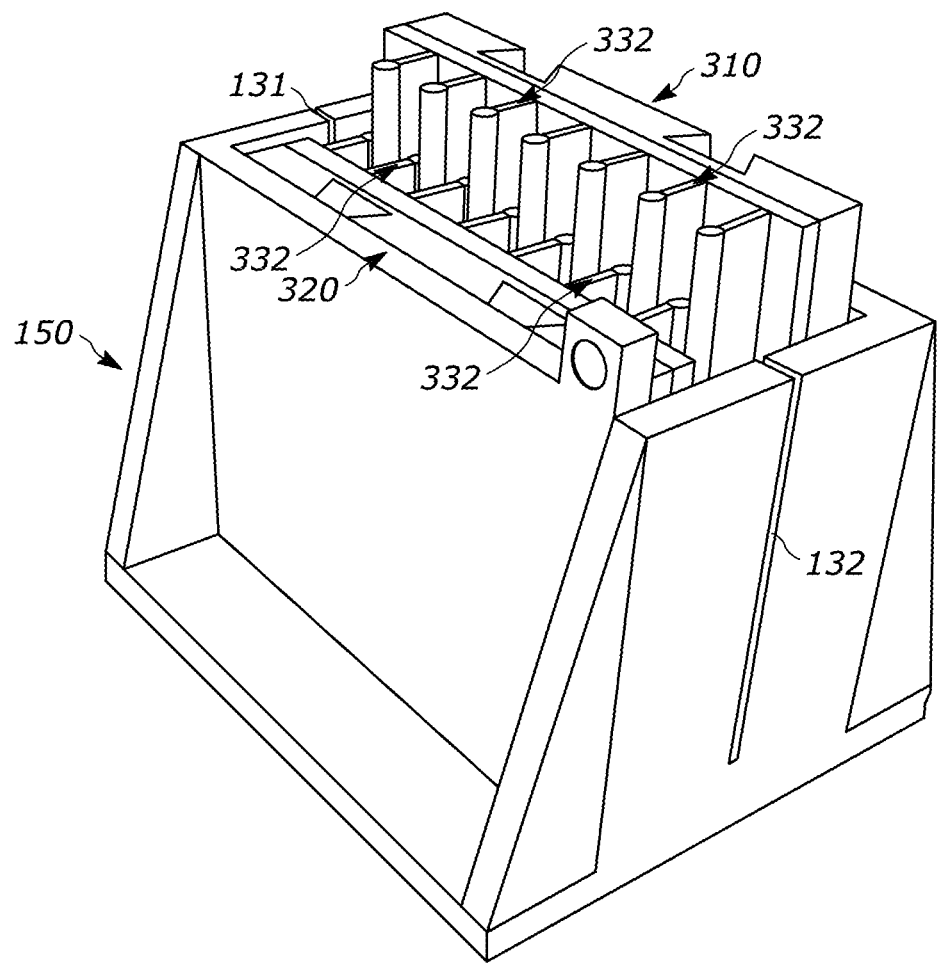
FIG. 6 illustrates another isometric view of the breaker container shown in FIGS. 1 and 2, with the insert members shown in FIGS. 3A and 4B disposed therein.

The plurality of breaker bars 332 can be set at various angles. For example, in at least one configuration the plurality of breaker bars 332 can be disposed perpendicular with respect to the base member 119, as shown in FIG. 3A, FIG. 4B, FIG. 6, and FIG. 7. Each of the first and second insert members 310, 320 are shown in FIGS. 3A, 4B, 6, and 7 as including seven (7) of such perpendicularly disposed plurality of breaker bars 332, although more or less plurality of breaker bars 332 are possible. As shown, these seven (7) plurality of breaker bars 332 are disposed substantially equidistant from each other. In at least one other configuration, the plurality of breaker bars 332 can be disposed at an acute angle with respect to the base member 119, as shown in FIGS. 3B, 4C. In at least one exemplary configuration, this acute angle can be approximately sixty (60) degrees, as shown. Each of the first and second insert members 310, 320 are shown in FIGS. 3B and 4A as including four (4) of such acutely disposed plurality of breaker bars 332, although more or less plurality of breaker bars 332 are possible. As shown, these four (4) plurality of breaker bars 332 are disposed with two (2) of such plurality of breaker bars 332 at a negative acute angle and two (2) at a positive acute angle.

The wetout box apparatus 100 can further include a lid member 210 coupled to first ends 311, 321 of the first and second insert members 310, 320. Although the lid member 210 can be variously sized, in the configuration shown the lid member 210 is sized to corresponded to a size of the opening of the breaker container 150. As shown, when the lid member 210 is configured the lid member 210 can be disposed flush with a top of the breaker container 150 when the first and second insert members 310, 320 are disposed within the breaker container 150. In at least one configuration, a handle 170 can be coupled to a first side 211 of the lid member 210 to assist with disposition and removal of the first and second insert members 310, 320 into and from the breaker container 150.

In at least one configuration, the wetout box apparatus 100 can further include a first end member 220 coupled to first ends 312, 322 of the first and second insert members 310, 320, respectively. A second end member 230 can be coupled to second ends 313, 323 of the first and second insert members 310, 320, respectively. The first end member 220 including a third slot 231 and the second end member 230 including a fourth slot 232 that allow the mat to enter and exit the breaker container 150, respectively. In the exemplary configuration shown, the first and second end members 220, 230 are sized to correspond to an inside width of the breaker container 150 on the first side wall 112 and third side wall 116 of the breaker container 150, as shown, although other sizes are possible.

The wetout box apparatus 100 can further include a coupling mechanism 180 to couple the first and second insert members 310, 320 to the breaker container 150. In the exemplary configuration shown, the coupling mechanism 180 includes a plurality of dovetail joints 184 disposed along an inside perimeter of the breaker container 150. In the exemplary configuration shown, tails 185 of the plurality of dovetail joints 184 are coupled to the second side wall 114 and the fourth side wall 118, although other locations are possible. Two (2) of such plurality of dovetail joints 184 are coupled to each of the second and fourth side walls 114, 118, although more or less dovetail joints 184 are possible. Corresponding to the tails 185 are tail sockets 186 disposed within the lid member 210 and the first and second insert members 310, 320. In at least one configuration, a distance between the tails on opposite sides of the wetout box apparatus 100 is 3.496 inches, although other distances are possible.

During use of the wetout box apparatus 100, the mat 710 is disposed between the plurality of breaker bars 332, as shown in FIG. 7. Then, the wetout box apparatus 100 is setup with the first and second insert members 310, 320 disposed inside of the breaker container 150, as shown in FIG. 1, the mat 710 then being disposed within the first and second slots 131, 132 of the breaker container 150. Although not shown, the breaker container 150 can include an inlet port into which the resin 510 is pumped into the breaker container 150. The resin 510 is then circulated through the breaker container 150, via this inlet port. A fixed length of the mat 710 can be pulled laterally through the breaker container 150 and across the plurality of breaker bars 332 to exist the breaker container 150, such as via the second slot 132. As the mat 710 moves thru the wetout box apparatus 100, the mat 710 bends and snakes past the plurality of breaker bars 332 which creates openings and gaps between individual fibers of the mat 710, allowing the resin 510 to better encapsulate material fibers of the mat 710. This facilitates the resin 510 being applied to the mat 710. In at least one configuration, a pull force gage (not shown) can be coupled to a pull end of the mat 710. The mat 710 can then be pulled through the breaker container 150 for a distance, such as 1-2 feet. This wetout process can be completed in less time than is typically used for wetout, and, can preferably be performed in as little as 10 minutes or less.

Once the mat 710 exits the breaker container 150, excess resin 510 is squeegeed off of the resin 510 saturated mat 710. A visual inspection of the wetout process performed on the mat 710 is then performed to ensure that the mat 710 is evenly saturated with the resin 510. The mat 710 is then processed with a heat curve. The mat 710 can be measured for mass, volume and weight to determine a level of resin 510 saturation. Once curing is complete, the cured composite can be visually inspected for wetout uniformity. The cured composite formed with the wetout box apparatus 100 disclosed herein can be compared with control samples and sourced materials.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A wetout box apparatus comprising:
a breaker container to store a volume of resin therein, the breaker container including a first slot and a second slot that allow a mat to enter and exit the breaker container, respectively;
a first insert member to be disposed within the breaker container on a first side of the breaker container;
a second insert member to be disposed within the breaker container on a second side of the breaker container;
a plurality of breaker bars coupled to the first and second insert members, the plurality of breaker bars forming a snaking path for the mat between the first slot and the second slot; and
a first end member coupled to first ends of the first and second insert members, respectively, and a second end member coupled to second ends of the first and second insert members, respectively, the first end member including a third slot and the second end member including a fourth slot that allow the mat to enter and exit the breaker container, respectively.

2. The wetout box apparatus according to claim 1, wherein the breaker container includes a first side wall, a second side wall, a third side wall, a fourth side wall, and a base member, the first, second, third, fourth side walls and the base member coupled to store the volume of the resin.

3. The wetout box apparatus according to claim 1, further comprising a lid member coupled to first ends of the first and second insert members.

4. The wetout box apparatus according to claim 3, further comprising a handle coupled to a first side of the lid member.

5. The wetout box apparatus according to claim 1, further comprising a coupling mechanism to couple the first and second insert members to the breaker container.

6. The wetout box apparatus according to claim 5, wherein the coupling mechanism includes a plurality of dovetail joints disposed along an inside perimeter of the breaker container.

7. The wetout box apparatus according to claim 1, wherein the breaker container includes a base member, the plurality of breaker bars disposed at an acute angle with respect to the base member.

8. The wetout box apparatus according to claim 1, wherein the breaker container is rectangular.

9. A wetout box apparatus comprising:
a breaker container to store a volume of resin therein, the breaker container including a first slot and a second slot that allow a mat to enter and exit the breaker container, respectively;
a first insert member to be disposed within the breaker container on a first side of the breaker container;
a second insert member to be disposed within the breaker container on a second side of the breaker container; and
a plurality of breaker bars coupled to the first and second insert members, the plurality of breaker bars forming a snaking path for the mat between the first slot and the second slot,
wherein the plurality of breaker bars each include an arm that is perpendicularly coupled to first sides of the first and second insert members, respectively.

10. The wetout box apparatus according to claim 9, wherein the arm is substantially a same height as the first and second insert members.

11. The wetout box apparatus according to claim 9, wherein pairs of the arms are disposed proximate to each other to route the mat parallel with respect to the arm.

12. The wetout box apparatus according to claim 9, wherein the plurality of breaker bars each further include a rod coupled to an opposite end of the arm from an end of the arm that is coupled to the first sides of the first and second insert members, respectively.

13. The wetout box apparatus according to claim 12, wherein the rod is substantially a same height as the plurality of breaker bars.

14. A wetout box apparatus comprising:
a breaker container to store a volume of resin therein, the breaker container including a first slot and a second slot that allow a mat to enter and exit the breaker container, respectively;
a first insert member to be disposed within the breaker container on a first side of the breaker container;
a second insert member to be disposed within the breaker container on a second side of the breaker container;
a plurality of breaker bars coupled to the first and second insert members, the plurality of breaker bars forming a snaking path for the mat between the first slot and the second slot,
wherein the breaker container includes a first side wall, a second side wall, a third side wall, a fourth side wall, and a base member, the first, second, third, fourth side walls and the base member coupled to store the volume of the resin, and further includes first, second, third, and fourth reinforcement members disposed at corners of the breaker container, the first, second, third, and fourth reinforcement members each coupled to the base member, the first and second reinforcement members being coupled to the first side wall, and the third and fourth reinforcement members being coupled to the third side wall.

* * * * *